(12) United States Patent
Han et al.

(10) Patent No.: US 9,510,174 B2
(45) Date of Patent: Nov. 29, 2016

(54) METHOD FOR EMERGENCY-MESSAGE BROADCASTING USING VEHICULAR COMMUNICATION

(71) Applicant: KYUNGPOOK NATIONAL UNIVERSITY INDUSTRY-ACADEMIC COOPERATION FOUNDATION, Buk-gu, Daegu (KR)

(72) Inventors: Dong Seog Han, Daegu (KR); Jhi Hoon Joo, Daegu (KR)

(73) Assignee: KYUNGPOOK NATIONAL UNIVERSITY INDUSTRY-ACADEMIC COOPERATION FOUNDATION, Buk-Gu, Daegu (KR)

( * ) Notice: Subject to any disclaimer, the term of this patent is extended or adjusted under 35 U.S.C. 154(b) by 0 days.

(21) Appl. No.: 14/678,582

(22) Filed: Apr. 3, 2015

(65) Prior Publication Data

US 2016/0112856 A1 Apr. 21, 2016

(30) Foreign Application Priority Data

Oct. 16, 2014 (KR) .......................... 10-2014-0140127

(51) Int. Cl.
*H04M 11/00* (2006.01)
*H04W 4/22* (2009.01)
*H04W 76/00* (2009.01)
*H04L 29/08* (2006.01)

(52) U.S. Cl.
CPC ................ *H04W 4/22* (2013.01); *H04L 67/12* (2013.01); *H04W 76/007* (2013.01)

(58) Field of Classification Search
CPC . H04W 72/04; H04W 72/048; H04W 72/06; H04W 72/12; H04W 74/08; H04W 84/18; H04W 28/10; H04W 74/0816; H04W 74/085; H04W 74/0866
USPC ......... 455/404.1, 404.2, 456.1, 456.2, 456.3, 455/450, 452.1, 556.1, 575.9, 517
See application file for complete search history.

(56) References Cited

U.S. PATENT DOCUMENTS

| 8,276,743 | B2* | 10/2012 | Zimmermann | ........ B65H 29/12 198/406 |
| 2011/0128849 | A1* | 6/2011 | Guo | ...................... H04W 28/10 370/235 |
| 2011/0128902 | A1* | 6/2011 | Guo | ...................... G08G 1/161 370/312 |
| 2011/0213968 | A1* | 9/2011 | Zhang | ...................... H04L 63/20 713/158 |
| 2012/0120883 | A1* | 5/2012 | Chen | ...................... H04W 74/08 370/329 |

* cited by examiner

*Primary Examiner* — Jean Gelin
(74) *Attorney, Agent, or Firm* — Porzio, Bromberg & Newman, P.C.

(57) ABSTRACT

The present invention relates to a method for emergency message broadcasting of vehicular wherein transfers emergency message to peripheral vehicles in regards to vehicular communication network method of IEEE 802.11p/WAVE communication standard base. Emergency message broadcasting method according to the present invention features in promptly transferring emergency message to peripheral vehicles even when vehicles are in access to different channels in SCH (Service Channel) interval according to multiple channel operation wherein defined by IEEE 1609.4 of WAVE communication standard.

6 Claims, 4 Drawing Sheets

METHOD FOR EMERGENCY-MESSAGE BROADCASTING USING VEHICULAR COMMUNICATION

CROSS-REFERENCE TO RELATED APPLICATIONS

This application claims priority from Korean Patent Application No. 10-2014-0140127, filed on Oct. 16, 2014, in the Korean Intellectual Property Office, the disclosure of which is incorporated herein by reference in its entirety.

BACKGROUND

1. Field of the Invention

The present invention relates to a method for emergency-message broadcasting using vehicular communication based on IEEE 802.11p/WAVE communication standard wherein transmits emergency message information to peripheral vehicle.

A method for emergency-message broadcasting of the present invention can quickly transfer emergency message even when respective vehicles are accessed to different channels during SCH(Service Channel) interval according to multiple channel operation wherein defined by IEEE 1609.4 of WAVE communication standards.

2. Description of the Related Art

Vehicular ad-hoc network is a network system specialized in Mobile Ad-hoc Network structure for vehicle that moves fast on road. Vehicular network system not only supports communication between vehicle and infrastructure but also vehicle to vehicle and transmits safety related application as well as information/entertainment (infotainment) application. By using such vehicle network system, drivers can drive safer by using safety relevant application. Moreover, multi-media services such as media streaming, on-line game, and web-search can be provided.

Such vehicle network system can be regulated under IEEE 802.11p/WAVE (Wireless Access in Vehicular Environments) communication standard. The IEEE 802.11p/WAVE communication standard supports wireless communication system with high velocity, small range and low delay features in vehicle environment of active mobility. For this, WAVE communication standard includes IEEE 802.11p and IEEE 1609 standard. Herein, IEEE 1609.4 which is one of WAVE communication standard defines multiple channel operation for vehicle communication.

Following WAVE technology standard, vehicle communication operates using both methods of Time Division Multiple Access, TDMA and Frequency Division Multiple Access, FDMA.

For TDMA method, WAVE technology standard defines channel switching operation to SCG interval wherein includes CCH (Control Channel) interval and a plurality of SCH (Service Channel) interval. Herein, CCH interval and SCH interval can be formed basically in interval length of 50 ms.

For FDMA method, WAVE technology standard assigns 7 different channels. 7 channels, herein, can comprise 1 CCH and 6 SCH channels. Respective channel bandwidth is 10 MHz and CCH is used to exchange control information which includes a safety message and SCH is used to provide a non-safety message between nodes.

Boundary between TDMA and FDMA of such WAVE communication standard causes problems in transferring emergency messages. For example, when emergency message is generated during SCH interval, the emergency message is stored in queue until it becomes a CCH interval. Such procedure can be very inefficient in emergencies.

In an effort to solve the problem, various methods of transferring emergency message are suggested but, the method of transferring emergency messages only aims to shorten average delay time wherein necessary for transferring emergency messages. Thus, it has a problem of not being able to promptly transfer relevant messages to nearest neighbor vehicle wherein should receive message information regarding emergency event in priority (from the relevant event).

SUMMARY

Exemplary embodiments of the present inventive concept overcome the above disadvantages and other disadvantages not described above. Also, the present inventive concept is not required to overcome the disadvantages described above, and an exemplary embodiment of the present inventive concept may not overcome any of the problems described above.

The present invention provides a method for emergency-message broadcasting wherein provides relevant message from an individual vehicle to a nearest neighbor vehicle in priority when emergency message is generated during SCH interval wherein respective vehicle nodes access with other channels in regards to a vehicle communication method according to IEEE 802.11p/WAVE communication standards.

A method for emergency-message broadcasting by an individual vehicle using vehicular communication, comprising (A) receiving a beacon message from peripheral vehicle nodes during a first channel interval; (B) making a list of channel information wherein respective vehicle nodes are intending to approach among a plurality of channels of a second channel interval in an order of a distance between respective vehicle nodes and the individual vehicles; and (C) broadcasting the emergency message as switching a channel according to the list order when emergency message is generated during the second interval.

Communication between the individual vehicle and peripheral vehicle nodes, is implemented based on IEEE 802.11p WAVE communication standard and the first channel interval is CCH (Control Channel) interval and the second channel interval can be SCH (Service Channel) interval.

During the first channel interval, the individual vehicle and peripheral vehicle nodes communicate through 5.885 GHz to 5.895 GHz bandwidth, and during the second channel interval, the individual vehicle and vehicle nodes in vicinity can communicate through a plurality of channels.

The step (B) can include (B-1) calculating distance between respective vehicle nodes and the individual vehicle using location information of peripheral vehicle nodes included in received beacon message; (B-2) making a list of channel information of respective vehicle nodes intending to approach a second channel interval in an order starting from a vehicle node with small distance information in reference with an individual vehicle based on distance information calculated through the step (B-1).

The step (B) can make a list of channel information wherein vehicles located in back, are intending to approach according to driving direction and location of the individual vehicle.

The step (C) can include (C-1) generating emergency messages regarding the emergency event when emergency event is detected during the second channel interval; (C-2)

broadcasting the emergency message by switching channels according to a list order wherein written during the second channel interval; and (C-3) halting the (C-2) when no channel information is left on the list or when a third channel interval continuing from a second channel interval starts.

The step (C-1) can operate in case of receiving information regarding an emergency event from peripheral vehicle nodes or obtaining sensing information regarding emergency event via an additional sensor via a separate sensor.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF EXEMPLARY EMBODIMENTS

Figure 1:
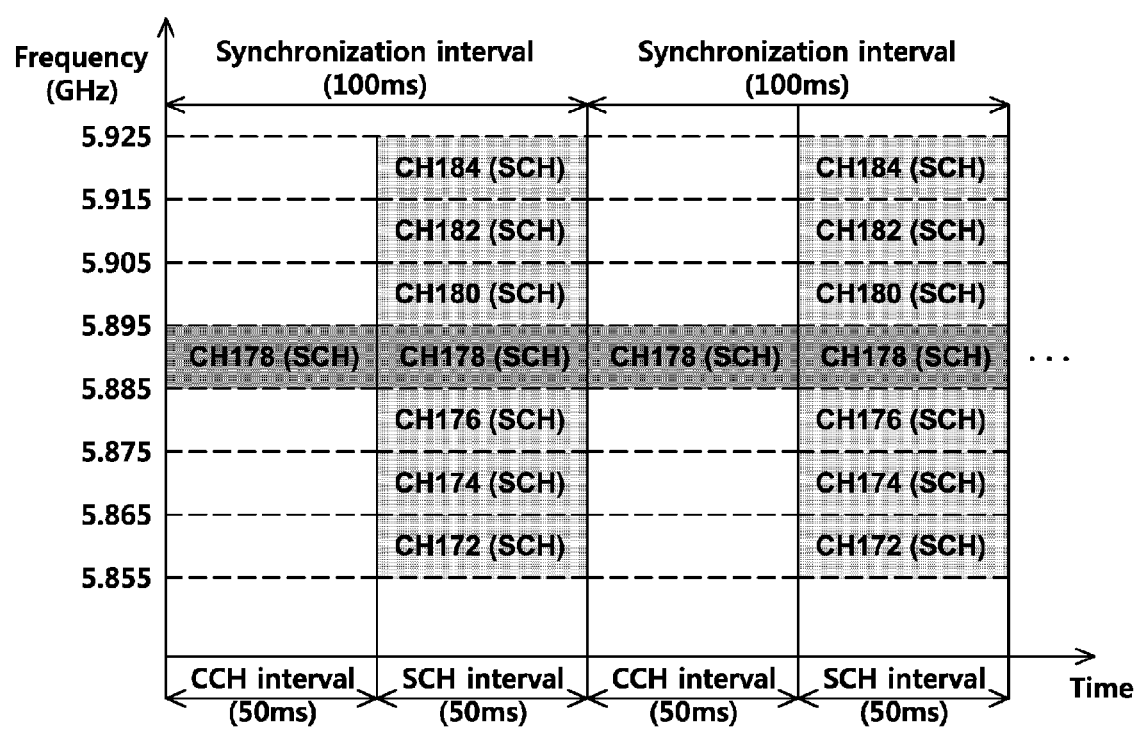
FIG. 1 illustrates multiple channel operation of IEEE 802.11p/WAVE communication standard.

Certain exemplary embodiments of the present inventive concept will now be described in greater detail with reference to the accompanying drawings.

In the following description, same drawing reference numerals are used for the same elements even in different drawings. The matters defined in the description, such as detailed construction and elements, are provided to assist in a comprehensive understanding of the present inventive concept. Accordingly, it is apparent that the exemplary embodiments of the present inventive concept can be carried out without those specifically defined matters. Also, well-known functions or constructions are not described in detail since they would obscure the invention with unnecessary detail.

While the expressions such as "first" or "second" can be used to refer to various elements, the elements are not limited by the expressions. The expressions are used only for the purpose of distinguishing one element from the other.

The expressions are used herein only for the purpose of explaining specific embodiments and not to limit the present invention. An expression in singular form encompasses plural meaning, unless otherwise specified. Throughout the description, the expression "comprise" or "have" is used only to designate the existence of characteristic, number, step, operation, element, component or a combination thereof which are described herein, but not to preclude possibility of existence of one or more of the other characteristics, numbers, steps, operations, elements, components or combinations of these or addition.

Hereinafter, the embodiment of the present invention will be recited in detail referring to the attached drawings.

IEEE 802.11p/WAVE communication standard wherein a method for emergency message broadcasting of the present invention is applied, defines 7 different channels, and operates using both TDMA and FDMA method. In other words, channel switching operation is operated in TDMA method and channel allocation is operated in FDMA method.

FIG. 1 is a diagram illustrating a multiple channel operation of IEEE 802.11p/WAVE communication standard.

For channel switching operation, fixed length of interval of CCH interval and SCH interval is used. Basically, length of respective channel intervals is 50 ms but, IEEE 1609.4 also supports active switching of channel space. For channel allocation, WAVE communication standard differentiates bandwidth from 5.895 GHz to 5.925 GHz into 7 different channels. Herein, center frequency of CCH is allocated to 5.890 GHz.

If emergency message is generated during CCH interval, the message is broadcasted to peripheral vehicles to transfer the message during remaining CCH interval when there is enough time. This is because all vehicle nodes are accessed to identical channel CCH during CCH interval. In this case, respective vehicles do not need separate channel scheduling operation to transmit emergency message.

Contrariwise, respective nodes access to different channels (SCH) during SCH interval. In other words, when emergency message is generated as one vehicle detects emergency event during SCG interval, the one vehicle cannot transfer the emergency message to peripheral vehicles through currently accessing channel.

Figure 2:
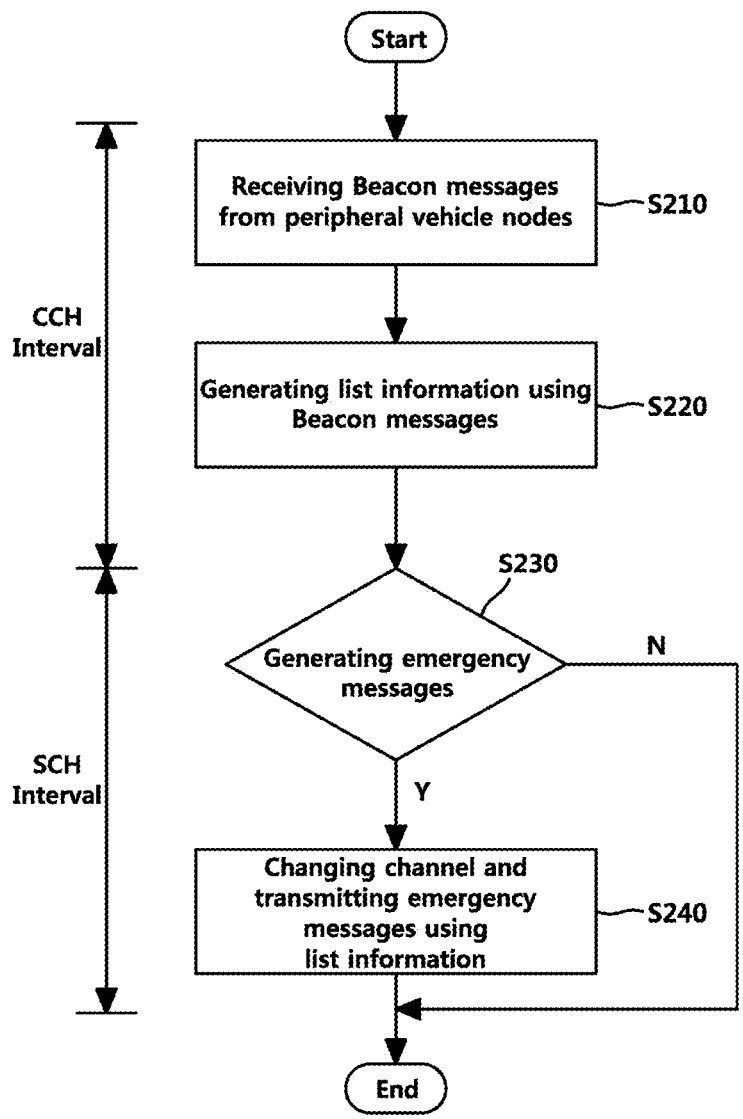
FIG. 2 is a flowing chart illustrating a method for emergency-message broadcasting using vehicular communication according to the first embodiment of the present invention.

A method for emergency-message broadcasting of vehicle is a message transfer method which can solve the above problem wherein explained in detail referring to FIG. 2.

FIG. 2 is a flow chart showing emergency message broadcasting method of vehicle according to the first embodiment of the present invention.

As illustrated in FIG. 2, a method for emergency message broadcasting of vehicle according to the embodiment of the present invention can operate wherein differentiated into CCH interval and SCH interval based on IEEE 802.11p/WAVE communication standard. Hereinafter, for the convenience of explanation a first channel interval is referred to as CCH interval of IEEE 802.11p/WAVE communication standard and a second channel interval is SCH interval is IEEE 802.11p/WAVE communication standard wherein recited in patent claim. Here, respective vehicle nodes perform vehicle communication through single channel (CH 178) of bandwidth of 5.885 GHz to 5.895 GHz during a first channel interval (CCH interval), respective vehicle communication can be implemented through one channel (CH 172~CH 176, CH 180 ~CH 184) of a plurality of channels of bandwidth 5.855 GHz to 5.925 GHz during a second channel interval (SCH interval).

Vehicle nodes receive beacon message from peripheral vehicle nodes during CCH interval. Here, the beacon message includes vehicle information wherein necessary to implement vehicle communication based on IEEE 802.11p/WAVE. For example, the vehicle information can include current location of vehicle, driving velocity, vehicle identification information. Additionally, the vehicle information includes channel information wherein respective vehicle intends to access during SCH interval. For example, in beacon message wherein transferred by a first vehicle includes location information of a first vehicle (ID ######)

and CH 172 wherein a first vehicle intends to access during SCH interval and in beacon messages wherein a second vehicle transferred includes location information of a second vehicle (ID @@@@@@) and CH 182 wherein a second vehicle intends to access during SCH interval. Information can be obtained wherein to access CH 172 by a first vehicle and wherein to access CH 182 by a second vehicle during SCH interval continued through the beacon message.

Make a list using one or more than two of beacon messages wherein received through the S210 step (S220). More specifically, calculate information regarding distance from a current individual vehicle based on received beacon message and make a list of channel information arranged wherein respective vehicles intend to access during SCH interval according to size order of the distance information (for example, in an order from small value to big value).

Various methods can be applied to calculate distance information between individual vehicle and respective vehicle nodes in the S220 step. For example, obtain location information of current individual vehicle through GPS receiver wherein equipped in individual vehicle and can calculate information of distance from a location information (A) of individual vehicle using location information (B) wherein include in beacon messages which is received from peripheral vehicles.

List information made through such method can be illustrated as the following table 1. Here, the list information can be made by using vehicle identification information of beacon message wherein received from respective vehicle nodes.

TABLE 1

| Vehicle Identification Information | Channel Information intending to access hereinafter |
|---|---|
| ID ###### | CH 172 |
| . | . |
| . | . |
| . | . |
| ID @@@@@@ | CH 182 |

In a preferable embodiment wherein applicable in the present invention, the S220 step can make a list with only vehicle information regarding vehicle located in the back according to individual vehicle. Generally, while driving, emergency which can have an effect on individual vehicle, mainly occur in the back not the front according to driving direction and location of current individual vehicle. In other words, when emergency event occurs, transferring emergency message information to back not front with reference to driving direction and location of individual vehicle regarding the emergency event is efficient in securing vehicle safety of vehicle in back.

Thus, in the step S220, list of only channel information wherein vehicles in back are intending to access according to driving direction and location of the individual vehicle, can be made. For this, list can be made regarding vehicles located in back according to individual vehicle using driving information (driving direction, current location information) wherein included in beacon message received from respective vehicle nodes thereof.

Hereinafter, in SCH interval wherein continuing from CCH interval, respective vehicle nodes select channels each intends to access and receive a relevant service. Referring to said example, when it becomes SCH interval a first vehicle (ID ######) have access to CH 172 and a second vehicle (ID @@@@@@) have access to CH 182 thereby, receive services regarding each channel. When respective vehicle becomes a service provider wherein respective vehicles perform services, respective vehicles can provide services through relevant channel.

Likewise, detects emergency messages generated in individual vehicle during SCH interval wherein continued from CCH interval (S230). The emergency message can be performed when emergency event is detected. Here, emergency event is determined based on sensing information wherein obtained through separate sensor (video sensor, infrared sensor, ultrasonic sensor etc.) or emergency event can be detected by receiving emergency event relevant information from peripheral vehicle node. The first embodiment of the emergency event can include all emergency such as broken vehicle, accident vehicle, minor collision between individual vehicle and other vehicle in vicinity of individual vehicle wherein relating to emergency which is impossible of general vehicle traffic.

When emergency message is generated through the S230 step, individual vehicle uses the list information and converts channel and broadcast emergency message wherein generated in the channel (S240). More specifically, when individual vehicle generates emergency message during SCH interval, channel is converted according to order of list information wherein generated through the S220 and broadcasts emergency message in relevant channel. Hereinafter, convert to another channel using the list information and perform operation of broadcasting emergency message of relevant channel. The operation can be implemented until broadcasting operation of emergency message regarding all channels of list information.

In the embodiment of the present invention, when individual vehicle broadcasts emergency message and convert channels in order, list information corresponding with relevant channel can be omitted. For example, when emergency message is broadcasted by channel switching to CH 182, vehicle relevant information wherein intended to access CH 182 of the list, can be omitted from relevant list information. Hereinafter, individual vehicle determines whether there is remaining channel information in relevant list information then broadcast emergency message by channel switching to relevant channel if there is remaining channel information and can halt further emergency message broadcasting operation if there is no remaining channel information.

According to IEEE 802.11p/WAVE communication standard, length of SCG interval are mostly fixed thereby, the SCH interval is completed and a new CCG interval can be started in a middle of receiving emergency message wherein channel switching to one or more than two channels during the SCG interval. In this case, individual vehicle can transfer emergency message to other vehicle nodes through CCH interval, thereby, no longer have to implement emergency message broadcasting operation through channel switching. In other words, a method for emergency message for broadcasting of vehicle according to the present invention only operates during SCH interval thereby halts emergency message broadcasting operation via channel switching although channel information (or vehicle node information) remains in the relevant list information when the SCH interval ends.

Hereinafter, features wherein the present invention configures compared to conventional art through a simulation result in regards to method for emergency message of vehicle according to the present invention is recited in detail.

Conventional art of the present invention is reciting by employing message transfer technology based on general WAVE communication standard and WSD (WAVE-enhanced Safety message Delivery) scheme.

Basic value of 50 ms is applied in terms of SCH interval length according to WAVE standard. Minimum competition window size is determined with 15 slot and slot time is determined with 16 us. According to a value of slot time, DIFS and EIFS respectively apply 64 us and 88 us. Size of emergency message is expected to be approximately 300 bit. Data transmission rate is determined with minimum value 3 Mbps wherein ensured by IEEE 802.11p. Transmission time of preamble is determined at 40 us and a number of channel wherein exist in certain interval is expected to be 7.

Figure 3:
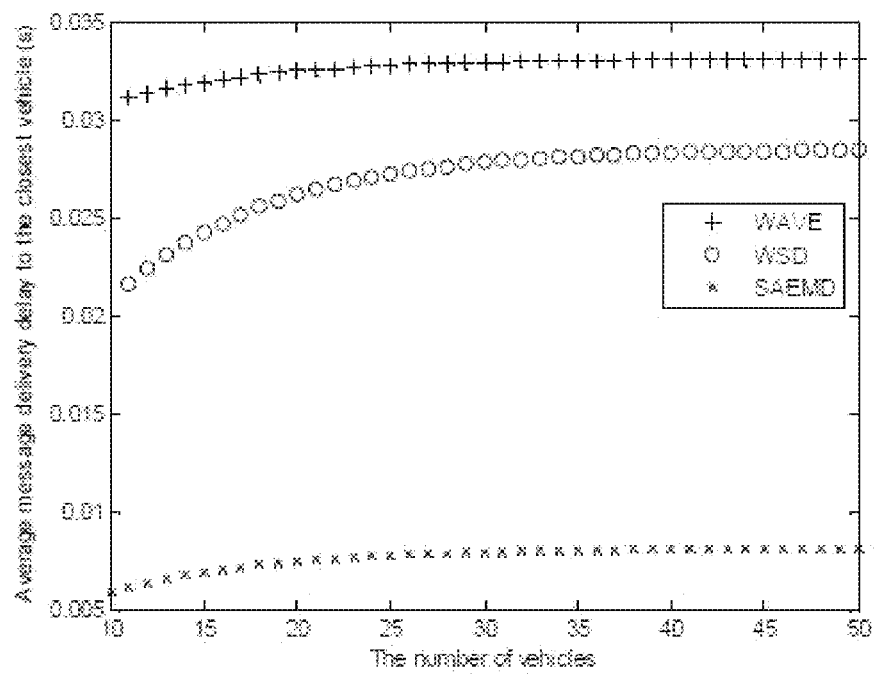
FIG. 3 is a diagram illustrating average message delay of nearest neighbor vehicle according to a number of peripheral vehicles in regards to a method for emergency-message broadcasting using vehicular communication according to the present invention and conventional art.

FIG. 3 is a diagram illustrating average message delay of nearest neighbor vehicle according to a number of peripheral vehicles regarding method for emergency message broadcasting according to conventional art and present invention.

As illustrated in FIG. 3, a method for emergency message of vehicle according to the present invention needs a very small delay in case emergency message transfer to nearest neighbor vehicle to individual vehicle compared to conventional art.

Figure 4:
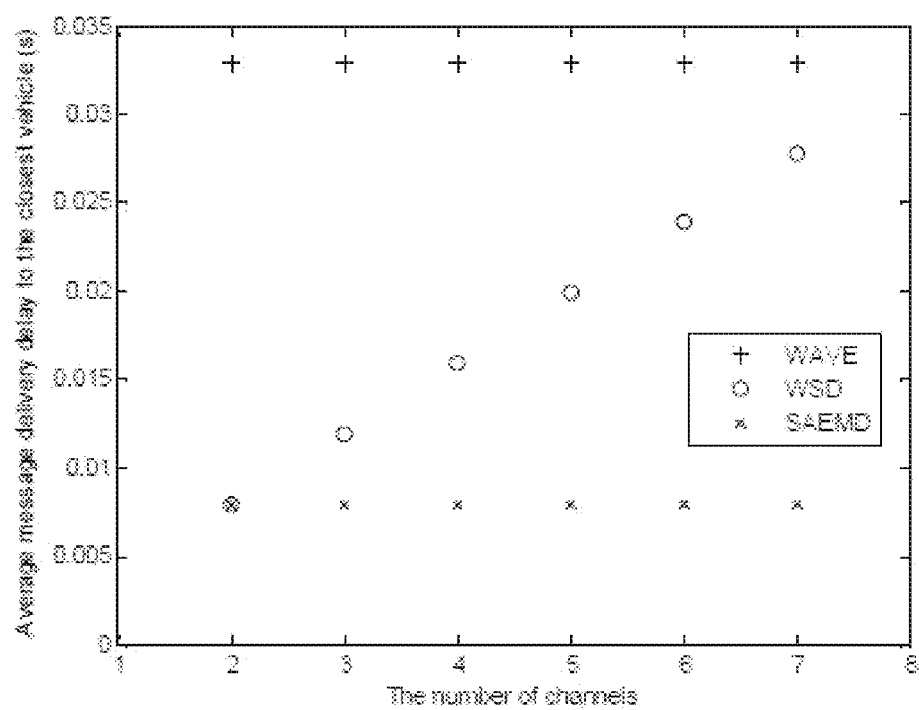
FIG. 4 illustrates average message delay of nearest neighbor vehicle according to a number of channels in regards to a method for emergency-message broadcasting using vehicular communication according to the present invention and conventional art.

FIG. 4 is a diagram illustrating average message delay of nearest neighbor vehicle according to a number of channels in regards to a method for emergency message of vehicle according to the present invention and conventional art.

Referring to FIG. 4, when a number of channels is two, WSD scheme which is one of conventional art is identical with delay value according to emergency message broadcasting method of the present invention. WSD scheme shows increase of delay value as a number of channels increases whereas, a method for emergency message broadcasting of vehicle according to the present invention has similar delay value regardless of a number of channels.

Likewise, a method for emergency message broadcasting of vehicle according to the present invention, promptly responds to the emergency event by transferring information of relevant event to a nearest vehicle node in small delay in case of emergency event.

A method for emergency message broadcasting of vehicle according to the embodiment of the present invention makes a channel list in an order of distance information by obtaining channel information wherein respective vehicle node and distance information of individual vehicle and the respective vehicle node intends to access during SCG interval through beacon message of peripheral vehicle nodes which are received during CCH interval and when emergency message is generated during SCH interval, it has an effect of quickly transferring emergency message to preferential peripheral vehicle.

The preferred embodiments of the invention have been explained so far. a person skilled in the art will understand that the invention may be implemented in modifications without departing from the basic characteristics of the invention. Accordingly, the foregoing exemplary embodiments and advantages are merely exemplary and are not to be construed as limiting the present invention. The present teaching can be readily applied to other types of apparatuses. Also, the description of the exemplary embodiments of the present inventive concept is intended to be illustrative, and not to limit the scope of the claims.

What is claimed is:

1. A method for emergency-message broadcasting by an individual vehicle using vehicular communication, comprising:
   (A) receiving a beacon message from peripheral vehicle nodes during a first channel interval;
   (B) making a list of channel information wherein respective vehicle nodes intends to approach among a plurality of channels of a second channel interval in an order of distance between respective vehicle nodes and the individual vehicle; and,
   (C) broadcasting the emergency-message by switching a channel according to the list order when emergency-message is generated during the second interval,
   wherein the step (B) makes a list of only channel information wherein vehicles located in back intends to approach according to driving direction and location of the individual vehicle.

2. A method for emergency-message broadcasting by an individual vehicle using vehicular communication of claim 1 wherein communication between the individual vehicle and peripheral vehicle nodes is implemented based on IEEE 802.11p WAVE communication standard,
   the first interval is CCH (Control Channel) interval, and
   the second interval is SCH (Service Channel) interval.

3. A method for emergency-message broadcasting by an individual vehicle using vehicular communication of claim 2 wherein the individual vehicle and peripheral vehicle nodes communicate through single channel of 5.885 GHz to 5.895 GHz bandwidth during the first channel interval; and
   the individual vehicle and peripheral vehicle nodes communicate through a plurality of channels of 5.855 GHz to 5.925 GHz bandwidth during the second channel interval.

4. A method for emergency-message broadcasting by an individual vehicle using vehicular communication of claim 1 wherein the step (B) comprising:
   (B-1) calculating distance between respective vehicle nodes and the individual vehicle using location information of peripheral vehicle nodes included in received beacon message and,
   (B-2) making a list of channel information of respective vehicle nodes intending to approach a second channel interval in an order starting from a vehicle node with small distance information in reference with individual vehicle based on distance information calculated through the step (B-1).

5. A method for emergency-message broadcasting by an individual vehicle using vehicular communication of claim 1 wherein the step (C) comprising:
   (C-1) generating emergency messages regarding the emergency event when emergency event is detected during the second channel interval:
   (C-2) broadcasting the emergency message by switching channels according to a list order wherein written during the second channel interval; and
   (C-3) halting the (C-2) when no channel information is left on the list or when a third channel interval continuing from a second channel interval starts.

6. A method for emergency-message broadcasting by an individual vehicle using vehicular communication of claim 5, wherein the step (C-1) is operating in case of receiving information regarding an emergency event from peripheral vehicle nodes or obtaining sensing information regarding emergency event via an additional sensor via a separate sensor.

* * * * *